Nov. 11, 1930. W. E. HOLLAND ET AL 1,781,641
ELECTROLYTIC CELL
Filed Oct. 30, 1925

Inventors:
Walter E. Holland,
Lawrence J. Pearson,
by their Attorneys,
Howson & Howson Patented Nov. 11, 1930

1,781,641

UNITED STATES PATENT OFFICE

WALTER E. HOLLAND, OF PHILADELPHIA, AND LAWRENCE J. PEARSON, OF WYNCOTE, PENNSYLVANIA, ASSIGNORS TO PHILADELPHIA STORAGE BATTERY COMPANY, OF PHILADELPHIA, PENNSYLVANIA, A CORPORATION OF PENNSYLVANIA

ELECTROLYTIC CELL

Application filed October 30, 1925. Serial No. 65,856.

This invention relates to electrolytic cells and more particularly cells of the type used for rectifying alternating electric current.

One of the principal objects of the invention is to provide a novel construction affording particular advantages in a cell having a layer of oil floating on the electrolyte solution, as hereinafter more fully set forth.

Another object of the invention is to provide an electrolytic cell having novel and improved means for making liquid-tight joints between the jar and the cover and between the electrodes and the apertures in the cover through which the electrodes extend to form the terminal posts.

A further object of the invention is to provide novel insulating and reinforcing means for the electrodes rendering practicable the use of brittle materials in forming the electrodes and insulating the film-forming electrode so that the rectifying action is confined to any given desired area well below the normal surface line of the electrolyte.

The invention further resides in certain novel and improved structural details as hereinafter fully disclosed and illustrated in the attached drawings, in which.

Figure 1:
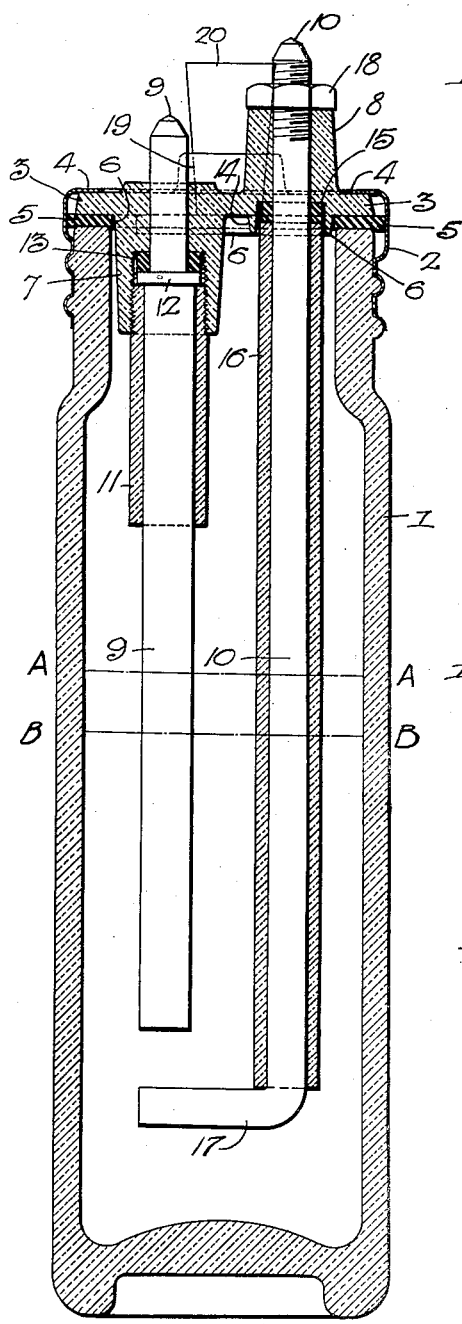
Figure 1 is a longitudinal sectional elevation taken on the line 1—1, Fig. 2.
Figure 2:
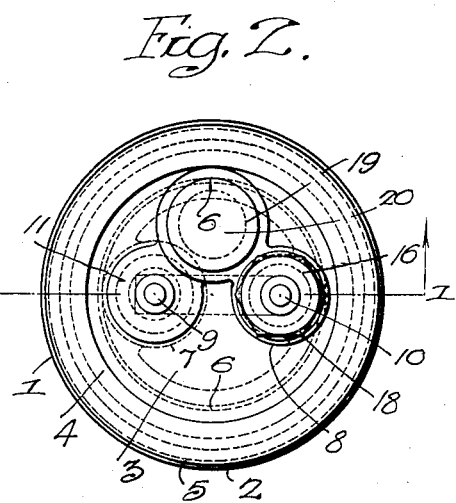
Fig. 2 is a plan view of the improved electrolytic cell.

With reference to the drawings, the cell comprises the usual container 1, which may be of glass and which is threaded at the top for reception of a threaded retaining sleeve 2 functioning to retain a cover plate 3 in the form of an apertured disk. As clearly shown, the sleeve 2 has a flange 4 at the top which overlies the edge of the disk 3 and confines the latter. A rubber or other gasket 5 is provided between the upper edge of the container and the cover 3, and it will be noted that an annular shoulder or rib 6 on the inside of the cover disk 3 abuts the inner edge of the gasket which also is annular in form. Also, the sleeve 2 fits closely the outer edge or periphery of the gasket so that the latter is closely confined between the top edge of the container, the disk 3, the rib or shoulder 6, and the sleeve 2.

The cover disk 3 has on opposite sides and in addition to a vent opening, apertured bosses 7 and 8 through which the respective electrodes 9 and 10 extend. The boss 7 on the inside of the cover is countersunk from the inside and threaded for reception of a sleeve 11, preferably of insulating material such as hard rubber or bakelite that will be unaffected by the electrolyte. The inner end of the sleeve 11, in assembly, abuts a flange or shoulder 12 on the electrode 9 and when screwed into the boss forces the flange firmly against a soft rubber washer 13 in the bottom of the countersunk recess, sealing the joint and retaining the electrode in place in the cover with substantial rigidity. The sleeve also functions to brace the electrode to a considerable depth below the cover which is of particular advantage where the material employed is weak or brittle. Under such circumstances, the extended sleeve obviously will tend to prevent possible fracture of the electrode below the cover. It will be noted that the washer 13, like the gasket 5, is confined on all four sides.

The cover disk 3 is, in the present instance, slightly recessed or countersunk below the boss 8, and a flange 14 is also provided at the edge of said countersink, the recess and flange forming a pocket for reception of a washer 15 and for the upper end of a sleeve 16 of hard rubber or other suitable insulating and electrolyte-proof material which is supported at the lower end by a flange or shoulder 17 on the film-forming electrode 10. This electrode is supported in the cover disk by means of a nut 18 which is threaded on the upper end of the electrode and bears against the top of the boss 8. When the nut 18 is tightened on the electrode, it accordingly pulls the latter up and forces the top of the sleeve 16 against the washer 15, which like the washer 13 is confined on all sides.

It will be noted the aforedescribed construction provides for different heights above the cover of the projecting ends of the electrodes without unduly extending unprotected lengths of either above the top of the cover disk, this difference in the heights of the electrode terminals in conjunction with differently arranged terminal engaging conducting elements, the latter forming no part in the present invention, providing means for preventing wrongly connecting the cell in a circuit.

The cell is partly filled with suitable electrolyte which may be covered with a layer of mineral oil. The level to which the cell may be initially filled with electrolyte solution is indicated by the broken line B—B and the level to which oil may be floated on top of the electrolyte is indicated by the line A—A. The film-forming electrode 10, as clearly illustrated, extends well below the initial electrolyte level and may be bent below the lower end of the sleeve 16 to extend transversely of the cell. By this means, the required area of exposed surface for efficient operation of the cell is provided and at the same time the insulating sleeve 16 is carried down to the lowest practicable point in the cell. The electrode 9, on the other hand, is straight throughout and its lower end preferably lies above the lower end of the sleeve 16. A practical reason for this arrangement is found in the use in the electrode 10 of aluminum, or other film-forming material which may be adversely affected by the abnormal electrolytic action which often takes place at the surface of the electrolyte. This arrangement is also advantageous because it is desirable that a relatively small constant area of exposed surface of the film-forming metal be maintained regardless of the height of the electrolyte in the cell. Furthermore, any possibility of ignition or explosion of the gases above the solution in a cell by sparking, which may occur under certain conditions at the film-forming electrode, is prevented by the construction described owing to the fact that the working surface of the film-forming metal must at all times remain beneath the surface level of the electrolyte.

With the construction described above, the sleeve 16 protects the electrode 10 at the electrolyte surface and also keeps the electrode 10 from coming in contact with the electrode 9 in case either electrode moves out of its normal position. It also insulates the electrode 10 from the electrolyte to a point well below the normal initial surface level of the electrolyte. If the latter falls below the bottom of the electrode 9, the circuit is opened and the cell ceases to function while the exposed or working portion of the electrode 10 is still completely submerged, this by reason of the fact that the insulating sleeve 16 extends below the bottom of the electrode 9. The life of the cell is consequently greatly increased through preservation of the electrode 10, and the cell may be used for a very long period without requiring the addition of water and without impairment of its efficiency or electrical characteristics by the dropping of the solution level. By reason of the transversely extending lower exposed end of the electrode 10, the electrolyte is permitted to fall to a lower level before nearing the bottom of the insulating sleeve 16 than if the electrode 10 were straight throughout, thereby increasing the period of active service of the cell without the addition of water.

Figure 3:
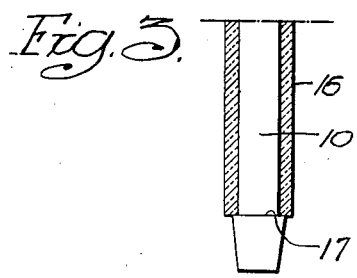
Fig. 3 is a fragmentary view, partly in section, of the inner extremity of the film-forming electrode illustrating a modification within the scope of the invention.

Under some circumstances, however, as when the current requirement is comparatively small, it may be desirable to decrease the area of the exposed portion of the film-forming electrode, and under such circumstances the electrode may be made straight as shown in Fig. 3, without sacrificing any of the advantages obtained under other circumstances through the form of electrode previously described and illustrated in Fig. 1.

When an electrolyte is used of the character described in a pending application, Serial Number 16,578, filed March 18, 1925, and the rectifier is operated without the addition of water, the life of the rectifier cell is likely to be terminated by the jellying and subsequent drying-out of the electrolyte before the electrolyte level has fallen to the bottom of the electrode 9. Under such circumstances the electrode 9 may be extended to a level below the bottom of the insulating sleeve 16 of the electrode 10 without detriment.

In cells of this character, it is often desirable, in order to reduce evaporation of the electrolyte to a minimum, to cover the electrolyte with a layer of mineral oil or similar light but non-volatile liquid immiscible with and inert with respect to the electrolyte. Mineral oil, while not adversely affecting the sealing properties of the rubber washers 13 and 15 and the gasket 5, has the effect of causing the rubber to expand. By confining the washers and gasket as described above, we provide for maintaining the integrity of the seals, since expansion of the rubber is limited in all directions, and what swelling may occur by reason of oil creeping or being slopped so that it reaches the soft rubber parts merely tightens the packing and renders the joints tighter. The sealing construction described is of advantage in battery or other electrolytic cells, as well as rectifier cells, especially when oil is used in the cells. In some cases it may be desirable to coat the soft rubber washers and gaskets with oil or grease before mounting them in the cell, especially if no oil is used on the surface of the electrolyte solution, to insure expansion of the rubber by the action of the oil after the parts are assembled, thus forming a very tight seal.

It is essential, where cells are shipped with the electrolyte in them, that these joints be leak-proof, and for this purpose, the present construction is particularly desirable. When so shipped, the vent port 19 may be tightly closed by a cork 20 or other suitable detachable stopper.

We claim:

1. An electrolytic cell comprising a container, a cover secured thereto, an air-tight rubber gasket intermediate the cover and the container confined against both lateral and perpendicular expansion, and mineral oil or grease associated with said gasket.

2. An electrolytic cell comprising a container, a cover for the container, an electrode projecting through the cover, a completely confined air-tight rubber gasket sealing the joint between cover and electrode, and a mineral oil or grease associated with said gasket.

3. An electrolytic cell comprising a container, a cover for the container having a countersunk opening, an electrode projecting through said opening and having a flange within said countersink, a sleeve surrounding the electrode and threaded into said countersink below said flange, and a gasket confined between the flange and the bottom of said countersink.

4. An electrolytic cell comprising a container, a cover for the container having a countersunk opening, an electrode extending through the opening and having a threaded projecting end, a shoulder on the electrode below the cover, an insulating sleeve surrounding the electrode and supported on the said shoulder, a gasket confined in the countersunk recess by the upper end of said sleeve, and a nut on the threaded projecting end of the electrode bearing on the top of the cover.

5. An electrolytic cell comprising a container, a cover for the container having an upwardly projecting hollow boss and a countersink in the lower part of said boss, an electrode extending through the boss, a nut on the threaded projecting upper end of the electrode bearing on the top of said boss, a shoulder on the electrode in the interior of the container, a sleeve surrounding the electrode and supported on the said shoulder, and a gasket confined in the said countersink by the upper end of said sleeve.

6. An electrolytic cell comprising a container, a cover for the container, said cover having a pair of apertured bosses projecting respectively from the inner and outer surfaces thereof, electrodes extending through the bosses to different heights above the cover, the electrode extending through the upper boss being higher at the top than the other electrode, and means for securing the electrodes in the cover.

7. An electrolytic cell comprising a container, a cover for the container having an apertured boss projecting from each of the inner and outer surfaces thereof, electrodes extending through the bosses, and means engaging the top of the outer boss and the bottom of the inner boss for securing the electrodes in the cover.

8. An electrolytic cell comprising a container, a cover for the container having an apertured boss projecting from each of the inner and outer surfaces thereof, an electrode extending through each of the bosses, a member threaded into the inner boss for retaining one electrode, and a member threaded onto the second electrode and engaging the outer boss for retaining said second electrode in the cover.

WALTER E. HOLLAND.
LAWRENCE J. PEARSON.